United States Patent [19]

Marks et al.

[11] 4,180,980

[45] Jan. 1, 1980

[54] HYDROPRESSURE POWER

[76] Inventors: Ronald A. Marks, 23362 Burton St., Canoga Park, Calif. 91304; John O. Dorius, 121 Sinclair, Glendale, Calif. 91206

[21] Appl. No.: 884,106

[22] Filed: Mar. 7, 1978

[51] Int. Cl.² ............................................. F15B 11/06
[52] U.S. Cl. ..................................... 60/398; 60/407; 55/159; 60/327; 417/108
[58] Field of Search .......................... 60/325, 327–336, 60/398, 407; 417/90, 108; 55/159; 261/DIG. 75; 405/53

[56] References Cited

U.S. PATENT DOCUMENTS

| 543,410 | 7/1895 | Taylor | 261/DIG. 75 |
|---|---|---|---|
| 753,045 | 2/1904 | Cooper | 166/277 |
| 806,104 | 12/1905 | Burkhard | 417/108 |
| 1,339,137 | 5/1920 | Rodgers | 417/108 |

*Primary Examiner*—Edgar W. Geoghegan
*Attorney, Agent, or Firm*—Nilsson, Robbins, Dalgarn, Berliner, Carson & Wurst

[57] ABSTRACT

A method and apparatus for releasing for use, air that has been absorbed under pressure in sea water or in any other large free body of water. An elongated conduit, or equivalent means, is vertically disposed so that air released from its upper end is collected by an open-bottom container serving as a reservoir. The interface of the collected air and the submersion level of water within the reservoir is substantially below the free water surface level. A small amount of gas is introduced at the lower end of the conduit so as to rise upwardly through the conduit, thereby carrying water behind it, and to initiate a continuous process in which the rising water is under decreasing pressure, at times increasing temperature, thereby releasing more air, which in turn carries more water behind it, and so on. Air from the reservoir can be used as an energy source.

16 Claims, 2 Drawing Figures

HYDROPRESSURE POWER

FIELD OF THE INVENTION

The invention relates to fluid transport processes.

BACKGROUND AND SUMMARY OF THE INVENTION

Any large body of water such as an ocean or lake has a resource with the potential for supplying large amounts of energy which could be used in lieu of more conventional energy sources, but which has heretofore remained untapped. This resource is absorbed air contained within the subsurface water. Extraction of the absorbed air can provide energy which is both economical and virtually unlimited.

Using the ocean as an example, although the process is not limited to ocean use, water comprising the lower depths generally has more absorbed air than that nearer the surface. This is caused by the following natural phenomenon: (1) the ability of a liquid to retain a dissolved gas varies indirectly as the absolute temperature, that is, as the temperature decreases the amount of dissolved gas can increase and vice versa; and, (2) Henry's law, which states that the amount of gas that dissolves in a liquid at a given temperature is very nearly proportional to the pressure of that gas, that is, at two atmospheres of pressure almost twice as much gas can be dissolved in a liquid, at three atmospheres, almost three times as much, and so on. Thus, sea water at lower levels has more air than sea water at upper levels. Air is absorbed in the water at the north and south latitudes where temperatures are low and suitable to take advantage of the increased solubility of gas in liquids at these lower temperatures. This cold, dense air-laden water flows to the deepest areas of the ocean and retains the air in accordance with the natural phenomenon described above. In order to release the absorbed air, therefore, one or both of two things can be done: (1) increase the temperature, or (2) decrease the pressure. In nature these things are accomplished in a continuous cycle. The same is true in a large lake in which air is absorbed during cold weather, the thus absorbed air and cold water sinking to the bottom due to convection currents, etc.

In accordance with Henry's law, by decreasing the pressure by one-half, the pressure of air absorbed in water will liberate one-half of that air from solution. If water at a given pressure within the ocean could be raised to such a point that the pressure decreases by one-half then one-half of the absorbed air within that water would be released. Thus it can be seen that if cold, dense, air-laden water can be brought up from the depths to a lower pressure and possibly a warmer temperature as well, air will be released from the water as it rises and will be maintained at the pressure corresponding to the pressure of the surrounding water level. Therefore, if that released air is contained at a pressure higher than that of normal atmospheric pressure, that pressurized air when allowed to expand to a volume corresponding to the surface pressure can releasee energy for a variety of uses. For example, the air escaping from a pressurized container could be used to operate an air-driven engine.

The invention disclosed herein accomplishes just such a result by providing a means to raise the air laden water from a lower depth to a higher depth so that the air will be released from the water and contained for subsequent use. The apparatus required is simply: a container having an opening disposable substantially below the free surface level, the container serving as a reservoir for collecting air released from the water; a self-sustaining water conveying means such as an elongated conduit having one end discharging into the container opening and another end at a point much lower in the body of water; and means for introducing or releasing a small quantity of gas (such as air) into the lower end of the conduit so that the gas will rise upwardly through the conduit. As this "priming" gas rises upwardly it also draws water adjacent to the lower end of the conduit upwardly through the conduit. The rising water is under decreasing pressure, and at times increasing temperature, so that it releases some of the air contained therein, thereby creating more upwardly rising bubbles and drawing more water into the lower end of the conduit. Once the cycle is initiated the system is self-sustaining and water will continue to rise upwardly through the conduit virtually indefinitely, displacing water initially in the reservoir container to the surrounding water. As the reservoir container fills with air, the air contained therein is maintained at a pressure corresponding to the ambient water pressure surrounding the collection chamber. If, for example, the water level within the reservoir container were 33 feet below the water surface, the pressure within the container would be 29.4 pounds per square inch compared with a surface pressure of 14.7 pounds per square inch (at sea level). By controlling release of the air from the reservoir container to the surface of the water the higher pressure air can be utilized in any of a variety of ways such as operating an air-driven engine.

By "self-sustaining water conveying means" is meant any apparatus used for the release of absorbed pressurized air by conveying air-laden water from high pressure and/or low temperature conditions to lower pressure and/or higher temperature conditions for the purpose of releasing the absorbed pressurized air. The term air means any gas or mixture of gases normally found in the atmosphere.

DETAILED DESCRIPTION

As required, a detailed illustrative embodiment of the invention is disclosed herein. However, it is to be recognized that modifications can be made to the specific structural details disclosed. Accordingly, the specific structural details disclosed are representative in providing a basis for the claims which define the scope of the present invention.

As above indicated, the invention discloses an apparatus and method for extracting pressurized air from a body of water having a sufficient depth so that air absorbed in water contained at a lower level will be released as its pressure is reduced, and possibly as its temperature is increased. When these conditions are present, initiation of the process of air release will result in a self-sustaining release of air virtually indefinitely.

Figure 1:
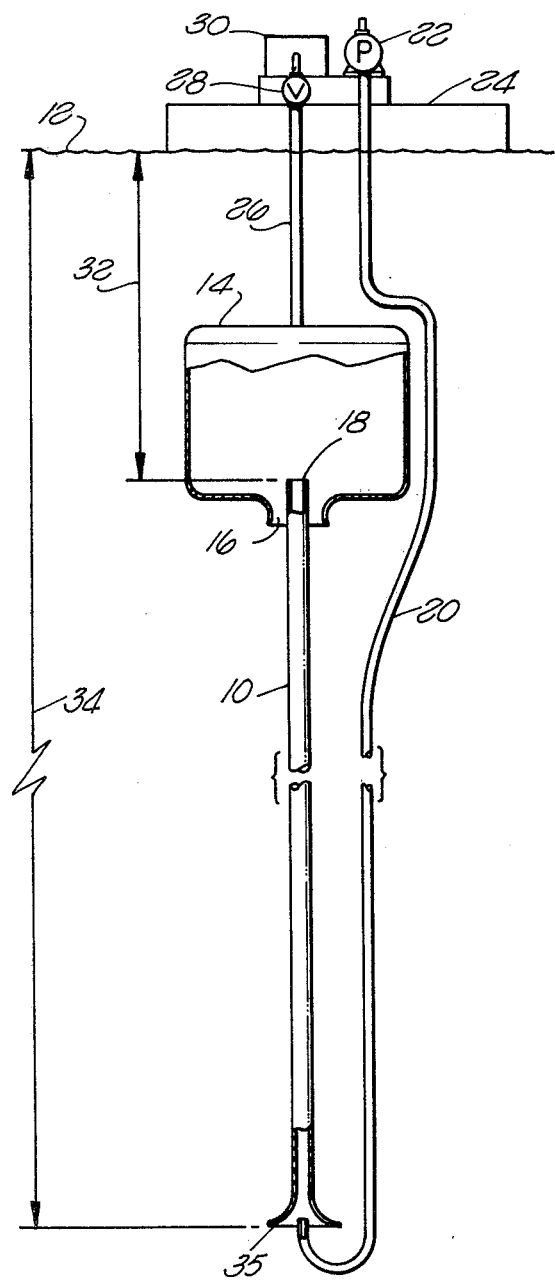
FIG. 1 is a schematic elevational view of one embodiment of an apparatus according to the invention prior to initiation of the air extraction process; and, FIG. 2 is a schematic elevational view of one embodiment of an apparatus according to the invention after initiation of the air extraction process.

Supportive and operative elements of the invention can be seen in FIG. 1. An elongated tubular conduit 10 is positioned vertically below the surface of a large body of water 12. A reservoir container 14 serves as a collection chamber for air to be extracted. The container 14 has an open end 16 positioned over an upper end 18 of the tubular conduit 10 so that air exiting therefrom rises into and is contained within the reservoir container 14. The open end of 16 of the container 14 has an aperture larger than the outer diameter of the tubular conduit 10 so that water contained within the container 14 can flow outwardly as air rising from the conduit 10 displaces water from the container 14. The tubular conduit 10 extends a substantial distance into the water, for example 10 feet, preferably more. A tube 20, smaller in diameter than the conduit 10 is connected to an air pump 22 supported by a surface structure 24, which could either be a fixedly mouted platform, or a buoy, boat, raft, or the like. The tube 20 extends from the surface structure 24 to the bottom of the conduit 10 and is curved to have its distal end inserted into the lower end 35 of the conduit 10. The air pump 22 is used to introduce a small quantity of air via the tube 20 into the lower end 35 of the conduit 10. Thereafter, the tube 20 can be withdrawn and removed. A flexible tube 26 connects to a controllable valve 28 and to the reservoir container 14. With the valve 28 in an open position, pressurized air from within the reservoir container 14 can flow to the outside air at the water surface 12 while driving some type of energy converting device such as an air-driven engine/electric generator combination indicated schematically at 30. The elongated tubular conduit 10 can be formed of plastic material having an inner diameter of one-eighth of an inch and disposed so that its upper end 18 terminates in such a manner as to allow released air to enter the reservoir 14 through the opening 16 at said upper end 18, and the distance 34 between its lower end 35 and the water surface 12 is great enough to allow the release of absorbed pressurized air from the water as it is raised from the area 35 (of high pressure and/or low temperature) to the higher area 18 (lower pressure and at times higher temperatures). Note that the upper end 18 of the conduit need not protrude into the reservoir as long as the bubbles emerging from the end 18 are sufficiently directed toward or into the reservoir to effect the displacement of water therein through openings 16. In a particular example the lower end 35 of the conduit 10 is disposed 133 feet below the free level of the water.

Figure 2:
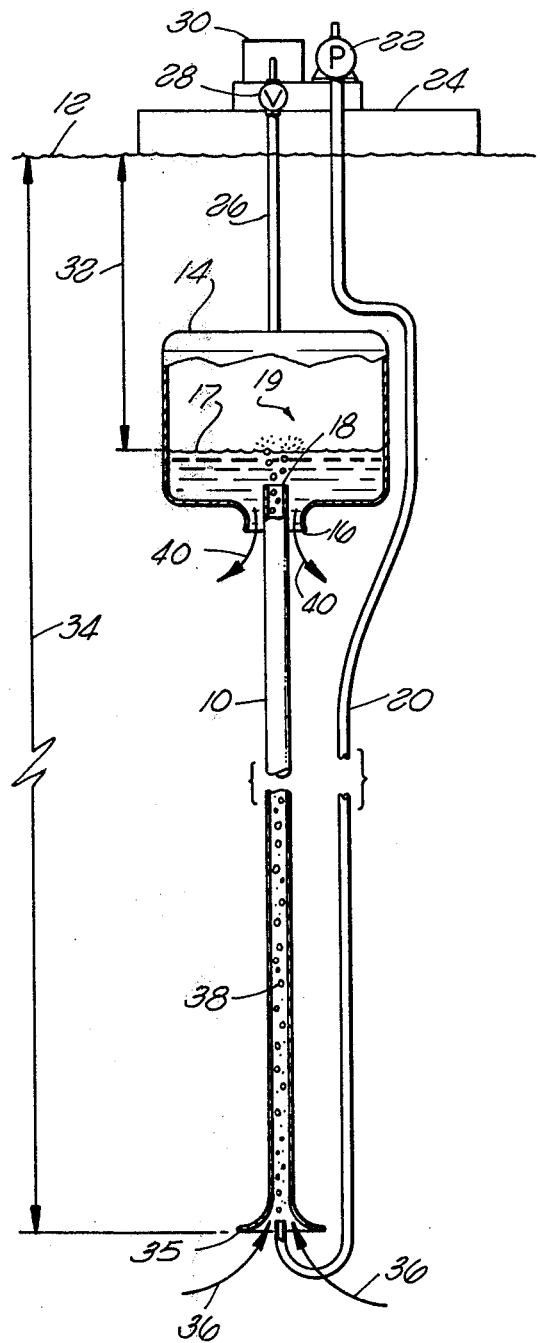

Operation of the system can be seen by referring to FIG. 2. When an initial charge of gas is provided by the pump 22 or equivalent means, the air so supplied rises upwardly in the elongated conduit 10. As this air rises upwardly, it draws a quantity of water 36 adjacent the conduit lower end 35 into and upwardly through the conduit 10. As this water is drawn upwardly, air contained within the water is released thereby forming additional upwardly rising air bubbles 38, thereby drawing more water 36 into the conduit 10. As this air exits from the conduit upper end 18 and into the reservoir container 14, it displaces water 40 contained therein which then flows outwardly from the reservoir container 14 and into the surrounding water at the level of opening 16, say at 33 feet below the free water level. The reservoir container 14 can be positioned anywhere with respect to the water surface 12 so long as the depth of the interface of the air and the water 17 within the container 14 exits at a level 32 below the free water surface 12 great enough to create the desired differential in pressure. In this illustrated embodiment, the open space 16 permits release of water 40 from the reservoir 14 as it is being displaced by the air 19. In other embodiments the reservoir container can be located above the level of the water as long as the interface of the air and water 17 is submerged at the desired depth.

It will be appreciated that in this embodiment the air 19 within the reservoir container 14 will be pressurized at a pressure corresponding to the water depth 32 at the surface level 17. This is in contrast to the water pressure at the entering depth 34. Since the upward flow of water through the conduit 10 and the release of the air contained therein is a self-perpetuating process, the pressurized air 19 contained within the reservoir container 14 will continue to be collected until all of the water 40 contained therein is displaced. At this point one can appreciate that air is contained on one side of the controlable valve 28 at a pressure greater than atmospheric surface pressure and on the other side at atmospheric water surface pressure. This pressure differential can be utilized for the extraction of useful work until such time as the air 19 within the reservoir container 14 is exhausted.

It will also be appreciated that an extension of the reservoir can be provided positioned anywhere above the reservoir 14 and connected thereto. For example, piping can lead from the reservoir 14 to a larger on-surface (or even on-shore) reservoir. Thus, if the platform 24 were hollow it could serve as such an extension.

We claim:

1. A method for releasing absorbed pressurized air from a body of water, the steps comprising:
   releasing an initial quantity only of gas in a submerged distal part of a self-sustaining means for conveying water;
   subsequent to release of said initial quantity of air, continuously collecting air exiting from the proximal end of said means in a reservoir container located above said distal part; and
   displacing water from said reservoir container responsive to collection of said air.

2. The method of claim 1 wherein said self-sustaining means for conveying water is a vertically disposed, elongated conduit.

3. The method of claim 1 wherein said reservoir container has an open bottom, and further comprising the step of positioning said container so that air can be contained therein while said container is submerged in said body of water.

4. The method of claim 1 wherein further comprising the step of releasing said collected air from said reservoir container.

5. The method of claim 1 wherein air from said reservoir container is delivered to a reservoir extension positioned above said reservoir container.

6. An apparatus for releasing and collecting absorbed pressured air from a body of water, comprising:
   a reservoir container for collecting air released from said water;
   means for positioning said reservoir container below the surface of a body of water;
   self-sustaining means below said reservoir container for conveying water;
   means for releasing water from said reservoir container responsive to collection of said air; and
   means for releasing an initial quantity only of gas in said self-sustaining means.

7. The apparatus of claim 6 in which said self-sustaining means for conveying water comprises an elongated conduit having a proximal end positioned for discharge into said reservoir container and a distal part positioned in said water substantially below said proximal end, said conduit being substantially vertically disposed so that gas released in said conduit at said distal part can rise upwardly through water contained within said conduit and exit through said proximal end.

8. The apparatus of claim 6 wherein said reservoir container has an open bottom, said container being positioned so that air can be contained therein while said container is submerged in said body of water.

9. The apparatus of claim 8 wherein said water releasing means comprises space between the open bottom end of said container and said conduit.

10. The apparatus of claim 6 further comprising means for releasing air collected within said reservoir container.

11. The apparatus of claim 8 in which said releasing means is an air-driven engine.

12. The apparatus of claim 7 wherein said elongated conduit is substantially straight, the proximal end of said conduit being positioned so as to discharge air into said reservoir container through its open end.

13. The apparatus of claim 7 in which said elongated circuit is sufficiently below the collecting surface so as to allow releasing of absorbed pressurized air from the water as the water rises to lower pressure and/or higher temperature surroundings.

14. An apparatus for releasing absorbed pressurized air from sea water comprising:
   a reservoir container having an open-bottom for collecting air released from said sea water, means for positioning said reservoir container below the surface of said sea water so that air pressurized with respect to the outside air can be contained within said reservoir container;
   a vertically disposed, elongated conduit below said reservoir container having a proximal end positioned so that air discharged therefrom will be contained within said reservoir container, and a distal end positioned below said proximal end; and
   means for releasing an initial quantity only of gas in a distal part of said conduit.

15. The apparatus of claim 14 in which said elongated conduit is sufficiently below the collecting surface so as to allow releasing of absorbed pressurized air from the water as the water rises to lower pressure and/or higher temperature surroundings.

16. The apparatus of claim 14 including an extension of said reservoir container connected thereto and positioned thereabove.

* * * * *

UNITED STATES PATENT AND TRADEMARK OFFICE
CERTIFICATE OF CORRECTION

PATENT NO. : 4,180,980
DATED : January 1, 1980
INVENTOR(S) : Ronald A. Marks, John O. Dorius It is certified that error appears in the above-identified patent and that said Letters Patent are hereby corrected as shown below:

Column 3, line 18, delete "mouted" and substitute therefor --mounted--.

Column 5, line 27, delete "circuit" and substitute therefor --conduit--.

Signed and Sealed this

Tenth Day of June 1980

[SEAL]

Attest:

SIDNEY A. DIAMOND

Attesting Officer

Commissioner of Patents and Trademarks